US010476960B1

(12) United States Patent
Rao et al.

(10) Patent No.: US 10,476,960 B1
(45) Date of Patent: Nov. 12, 2019

(54) HOST DEVICE CONFIGURED TO AUTOMATICALLY DISCOVER NEW PATHS RESPONSIVE TO STORAGE SYSTEM PROMPT

(71) Applicant: EMC IP Holding Company LLC, Hopkinton, MA (US)

(72) Inventors: Vinay G. Rao, Bangalore (IN); Sanjib Mallick, Bangalore (IN); Arieh Don, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 15/967,632

(22) Filed: May 1, 2018

(51) Int. Cl.
*H04L 29/08* (2006.01)
*H04L 12/24* (2006.01)

(52) U.S. Cl.
CPC .......... *H04L 67/1097* (2013.01); *H04L 41/12* (2013.01)

(58) Field of Classification Search
CPC ............................ H04L 67/1097; H04L 41/12
See application file for complete search history.

(56) References Cited

U.S. PATENT DOCUMENTS 6,687,746 B1 2/2004 Shuster et al.
6,697,875 B1 2/2004 Wilson
7,454,437 B1 11/2008 Lavallee et al.
7,818,428 B1 10/2010 Lavallee et al.
7,925,872 B2 4/2011 Lai et al.
8,825,919 B1 * 9/2014 Lim ........................ H04L 41/22 710/15
8,874,746 B1 * 10/2014 Gonzalez ................ H04L 69/40 709/203
9,594,780 B1 3/2017 Esposito et al.
9,778,852 B1 10/2017 Marshak et al.
2004/0010563 A1 1/2004 Forte et al.
2006/0277383 A1 * 12/2006 Hayden ............... H04L 67/1097 711/170

(Continued)

OTHER PUBLICATIONS

VMWARE, “Multipathing Configuration for Software iSCSI Using Port Binding,” Technical White Paper, Apr. 25, 2012, 15 pages.

(Continued)

*Primary Examiner* — Arvin Eskandarnia
(74) *Attorney, Agent, or Firm* — Ryan, Mason & Lewis, LLP

(57) ABSTRACT

An apparatus in one embodiment comprises a host device configured to communicate over a network with a storage system comprising a plurality of storage devices. The host device comprises a set of input-output queues and a multi-path input-output driver configured to select input-output operations from the set of input-output queues for delivery to the storage system over the network. The multi-path input-output driver is further configured to receive per-host path change information from the storage system indicating a change in at least one path from the host device to the storage system, to automatically initiate a path discovery scan in the host device based at least in part on the received per-host path change information, and to add one or more new paths identified in the path discovery scan to a set of active paths for the host device. The per-host path change information received from the storage system may comprise a value of a path change counter maintained by the storage system for the host device.

20 Claims, 2 Drawing Sheets

(56) References Cited

U.S. PATENT DOCUMENTS

| | | | | |
|---|---|---|---|---|
| 2008/0043973 | A1 | 2/2008 | Lai et al. | |
| 2011/0197027 | A1 | 8/2011 | Balasubramanian et al. | |
| 2011/0296230 | A1* | 12/2011 | Chen | H04L 49/357 714/3 |
| 2015/0222705 | A1* | 8/2015 | Stephens | G06F 3/0611 709/214 |
| 2016/0117113 | A1 | 4/2016 | Li et al. | |
| 2016/0335003 | A1* | 11/2016 | Ahmed | G06F 3/0619 |

OTHER PUBLICATIONS

Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
U.S. Appl. No. 15/795,653 filed in the name of Maneesh Pusalkar et al. Oct. 27, 2017 and entitled "Storage System with Network-Wide Configurable Device Names."
U.S. Appl. No. 15/849,828 filed in the name of Sanjib Mallick et al. Dec. 21, 2017 and entitled "Storage System with Input-Output Performance Control Utilizing Application Process Detection."

* cited by examiner

HOST DEVICE CONFIGURED TO AUTOMATICALLY DISCOVER NEW PATHS RESPONSIVE TO STORAGE SYSTEM PROMPT

FIELD

The field relates generally to information processing systems, and more particularly to storage in information processing systems.

BACKGROUND

A wide variety of different types of storage systems are known. For example, some storage systems are configured to include multiple storage tiers, with different ones of the tiers providing different levels of performance or other characteristics. In such storage systems, data may be moved from one tier to another within a given storage system based on access frequency of the data or other factors. These and other types of tiered or non-tiered storage systems may be shared by multiple host devices of a compute cluster. However, problems can arise in such arrangements when paths from one or more of the host devices to the storage system are added or deleted as a result of zoning and masking changes or other types of storage system reconfigurations performed by a storage administrator or other user. In some cases, a manual intervention by a host administrator may be required in order for a given one of the host devices to determine any changes in its paths to the storage system. The storage administrator is typically not able to control this path discovery function in the host device because he or she does not have access to the requisite host credentials. Numerous manual interventions may therefore be required over time as various changes are made to the paths.

SUMMARY

Illustrative embodiments of the present invention configure a multi-path layer of one or more host devices to include functionality for automatically discovering new paths responsive to a prompt from a shared storage array or other type of storage system. The multi-path layer illustratively comprises at least one multi-path input-output (MPIO) driver configured to process input-output (IO) operations of at least one host device. The prompt in some embodiments is in the form of what is more generally referred to herein as per-host path change information. These and other arrangements are advantageously configured to avoid the need for any type of manual intervention after the booting of a given host device and its discovery of an initial path to the storage system.

In one embodiment, an apparatus comprises a host device configured to communicate over a network with a storage system comprising a plurality of storage devices. The host device includes a set of IO queues and an MPIO driver configured to select IO operations from the set of IO queues for delivery to the storage system over the network. The MPIO driver is further configured to receive per-host path change information from the storage system indicating a change in at least one path from the host device to the storage system, to automatically initiate a path discovery scan in the host device based at least in part on the received per-host path change information, and to add one or more new paths identified in the path discovery scan to a set of active paths for the host device.

The per-host path change information received from the storage system may comprise a value of a path change counter maintained by the storage system for the host device, although other types of per-host path change information may be used.

As an example of an arrangement in which the per-host path change information comprises a value of a path change counter, automatically initiating a path discovery scan in the host device based at least in part on the received per-host path change information may more particularly comprise storing a first value of the path change counter received in a first response of the storage system to a first instance of a predetermined command sent to the storage system, comparing the stored first value of the path change counter to a second value of the path change counter received in a second response of the storage system to a second instance of the predetermined command sent to the storage system, and automatically initiating the path discovery scan in the host device responsive to detection of a difference between the first and second values of the path change counter.

In some embodiments, the MPIO driver comprises a user-space portion and a kernel-space portion. In an arrangement of this type, automatically initiating a path discovery scan in the host device based at least in part on the received per-host path change information may comprise the kernel-space portion of the MPIO driver detecting a difference between the received per-host path change information and previously-received per-host path change information and instructing the user-space portion of the MPIO driver to run the path discovery scan responsive to the detected difference.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
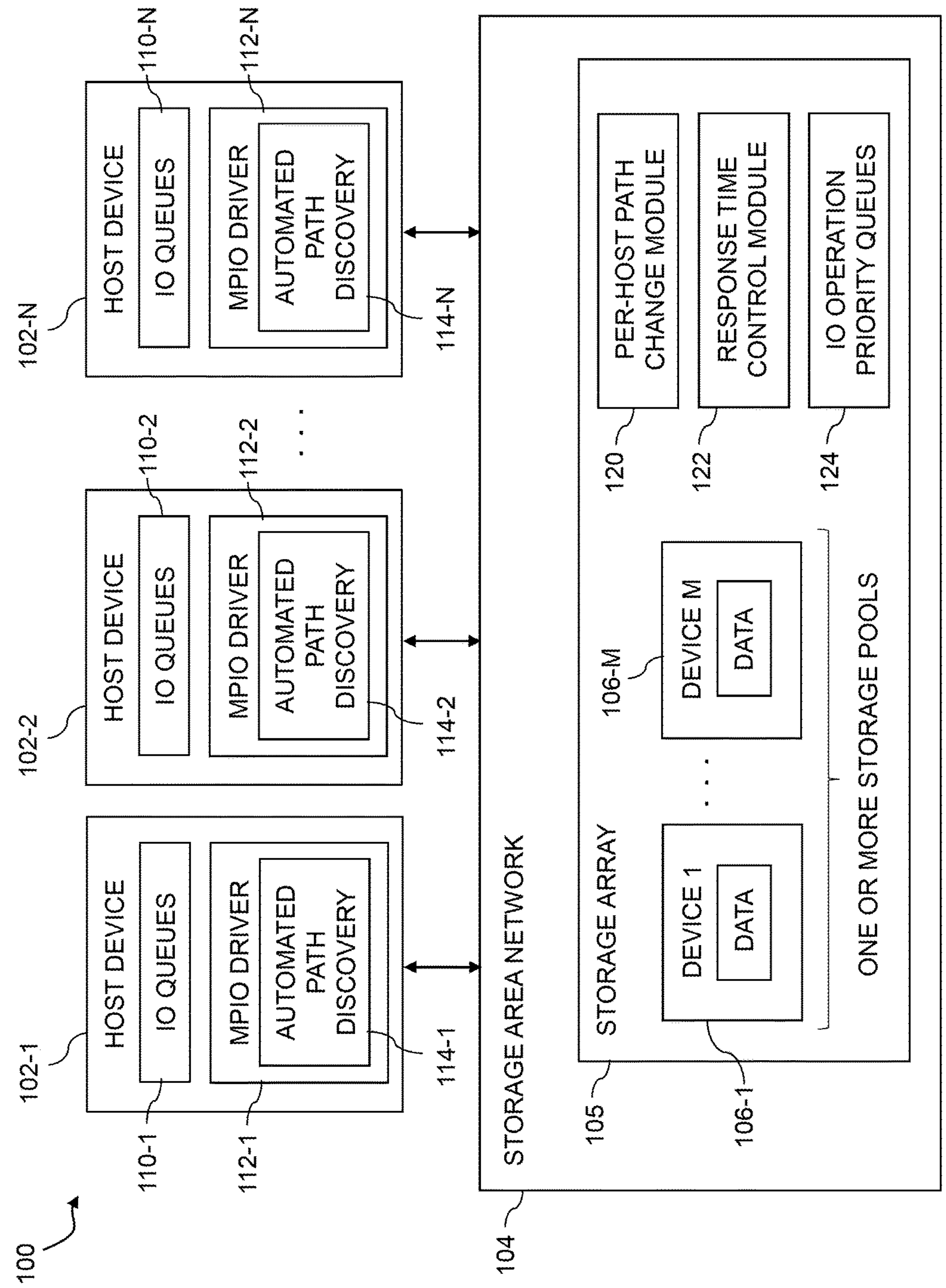
FIG. 1 is a block diagram of an information processing system configured with functionality for automated discovery of new paths utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "10" should be understood to refer to input and/or output. Thus, an IO operation relates to at least one of input and output.

Also, the term "storage device" as used herein is intended to be broadly construed, so as to encompass, for example, a logical storage device such as a LUN. A logical storage device can be defined in the storage array 105 to include different portions of one or more physical storage devices. Storage devices 106 may therefore be viewed as comprising respective LUNs or other logical storage devices.

Each of the host devices 102 may have multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for automated path discovery using respective automated path discovery modules 114-1, 114-2, . . . 114-N implemented within the MPIO drivers 112.

The MPIO driver 112-1 is configured to select IO operations from its corresponding set of IO queues 110-1 for delivery to the storage array 105 over the SAN 104. The MPIO driver 112-1 is further configured to receive per-host path change information from the storage array 105 indicating a change in at least one path from the host device 102-1 to the storage array 105, to automatically initiate a path discovery scan in the host device 102-1 based at least in part on the received per-host path change information, and to add one or more new paths identified in the path discovery scan to a set of active paths for the host device.

These and other functions of the MPIO driver 112-1 are carried out at least in part under the control of its automated path discovery module 114-1. For example, the automated path discovery module 114-1 is illustratively configured to control performance of the steps of the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to select IO operations from its corresponding one of the sets of IO queues 110 for delivery to the storage array 105 over the SAN 104.

The MPIO drivers 112 may comprise otherwise conventional MPIO drivers, such as PowerPath drivers from Dell EMC, suitably modified in the manner disclosed herein to perform automated path discovery responsive to at least one prompt from a storage system such as storage array 105.

The sources of the IO operations stored in the sets of IO queues 110 illustratively include respective processes of one or more applications executing on the one or more of the host devices 102. Other types of sources of IO operations may be present in a given implementation of system 100.

In some embodiments, the MPIO driver 112-1 of the host device 102-1 is configured to periodically send at least one predetermined command to the storage array 105 requesting the per-host path change information from the storage array 105 for the host device 102-1. For example, the per-host path change information may be stored in a persistent memory of the storage array 105, and read from the persistent memory utilizing one or more commands generated in the host device 102-1. The per-host path change information is transmitted by the storage array 105 to the MPIO driver 112-1 of the host device 102-1 responsive to receipt of the predetermined command by the storage array 105.

The persistent memory may comprise a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The one or more predetermined commands utilized by the MPIO driver 112-1 to read per-host path change information from the storage array 105 can include commands that are part of a standard command set or may include custom commands such as a "vendor unique command" or VU command that is not part of a standard command set. As a more particular example, a given predetermined command can include a VU mode sense command, a VU log sense command, or another type of VU command.

These and other commands used by the host devices 102 to communicate with the storage array 105 illustratively comprise SCSI commands, although as noted above other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein.

In some embodiments, a single predetermined command may be directed to a particular one of a plurality of ports of the storage array 105, and may include a payload that when processed in the storage array 105 covers all of the ports of the storage array 105 in substantially the same manner. In arrangements of this type, it is not necessary to send a separate predetermined command to each port.

The per-host path change information received by the MPIO driver 112-1 from the storage array 105 illustratively indicates at least one of addition of one or more new paths from the host device to the storage system and deletion of one or more existing paths from the host device to the storage system.

For example, the addition of one or more new paths or the deletion of one or more existing paths may result from respective addition or deletion of at least a portion of the storage devices 106 of the storage array 105.

As indicated previously, addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, the storage system is illustratively configured to provide appropriate adjustments in the per-host path change information that it maintains for the various host devices 102. For example, the storage system can detect events such as addition or deletion of a storage array that result in path changes, and adjust the per-host path change information accordingly.

In some embodiments, the per-host path change information received by the MPIO driver 112-1 from the storage array 105 responsive to a given instance of the predetermined command comprises a current value of a path change counter maintained by the storage array 105 for the host device 102-1. Responsive to receipt of the current value of the path change counter, the MPIO driver 112-1 automatically initiates the path discovery scan in the host device 102-1 based at least in part on the current value.

For example, the MPIO driver 112-1 may be configured to compare the received value of the path change counter with a previously-stored value received in a previous response of the storage array 105 to a previous instance of the predetermined command sent to the storage array 105. In such an arrangement, the path discovery scan is automatically initiated responsive to detection of a difference between the received value of the path change counter and the previously-stored value of the path change counter. A more detailed example of an arrangement of this type is described below in conjunction with the embodiment of FIG. 2.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover any the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect the above-described between the received path change counter or other type of received per-host path change information and previously-received path change counter or other type of received per-host path change information, and to instruct the user-space portion of the MPIO driver 112-1 to run the path discovery scan responsive to the detected difference. Other divisions of automated path discovery functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The above-described per-host path change information is illustratively maintained at least in part by a per-host path change module 120 of the storage array 105. The per-host path change module 120 is configured to monitor actual path changes for each of the host devices 102 and to store in the persistent memory of the storage array 105 separate path change information on a per-host basis for respective ones of the host devices 102, in order to support implementation of automated path discovery in the first MPIO driver 112-1.

Again, functionality described above in the context of the first MPIO driver 112-1 may be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support performance of automated path discovery responsive to a prompt received from the storage array 105.

As indicated previously, absent use of the automated path discovery techniques in an MPIO layer disclosed herein, it can be difficult for host devices to discover when paths from one or more of the host devices to the storage system are added or deleted as a result of zoning and masking changes or other types of storage system reconfigurations performed by a storage administrator or other user. In some cases, a manual intervention by a host administrator may be required in order for a given one of the host devices to determine any changes in its paths to the storage system. The storage administrator is typically not able to control this path discovery function in the host device because he or she does not have access to the requisite host credentials. Numerous manual interventions may therefore be required over time as various changes are made to the paths. In these and other situations, use of conventional path discovery arrangements can lead to sub-optimal performance.

Such drawbacks are advantageously overcome in illustrative embodiments herein by utilization of an MPIO layer comprising one or more of the MPIO drivers 112 to perform automated path discovery as described above. The automated path discovery is illustratively performed responsive to prompts generated at least in part by the per-host path change module 120 of the storage array 105.

The storage array 105 in the present embodiment comprises additional components such as response time control module 122 and IO operation priority queues 124. The response time control module 122 may be used to implement storage array based adjustments in response time for particular IO operations based at least in part on service level objective (SLO) information stored by the storage array 105 in its persistent memory. The response time control module 122 operates in conjunction with the IO operation priority queues 124.

The storage array 105 utilizes its IO operation priority queues 124 to provide different levels of performance for IO operations. For example, the IO operation priority queues 124 may have respective different priority levels. The storage array 105 may be configured to provide different priority levels for different ones of the IO operations by assigning different ones of the IO operations to different ones of the IO operation priority queues 124. The IO operation priority queues 124 are illustratively associated with respective SLOs for processing of IO operations in the storage array 105.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to implement maintenance of path change counters or other types of per-host path change information for automated path discovery in an MPIO layer as disclosed herein.

For example, the storage array 105 may comprise one or more storage arrays such as VNX®, Symmetrix VIVIAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of 10 queues 110, MPIO drivers 112 and automated path discovery modules 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 216, and is suitable for use in the system 100 but is more generally applicable to other types of systems comprising multiple host devices and a shared storage system. The shared storage system in this embodiment is assumed to comprise at least one storage array having a plurality of storage devices.

Figure 2:
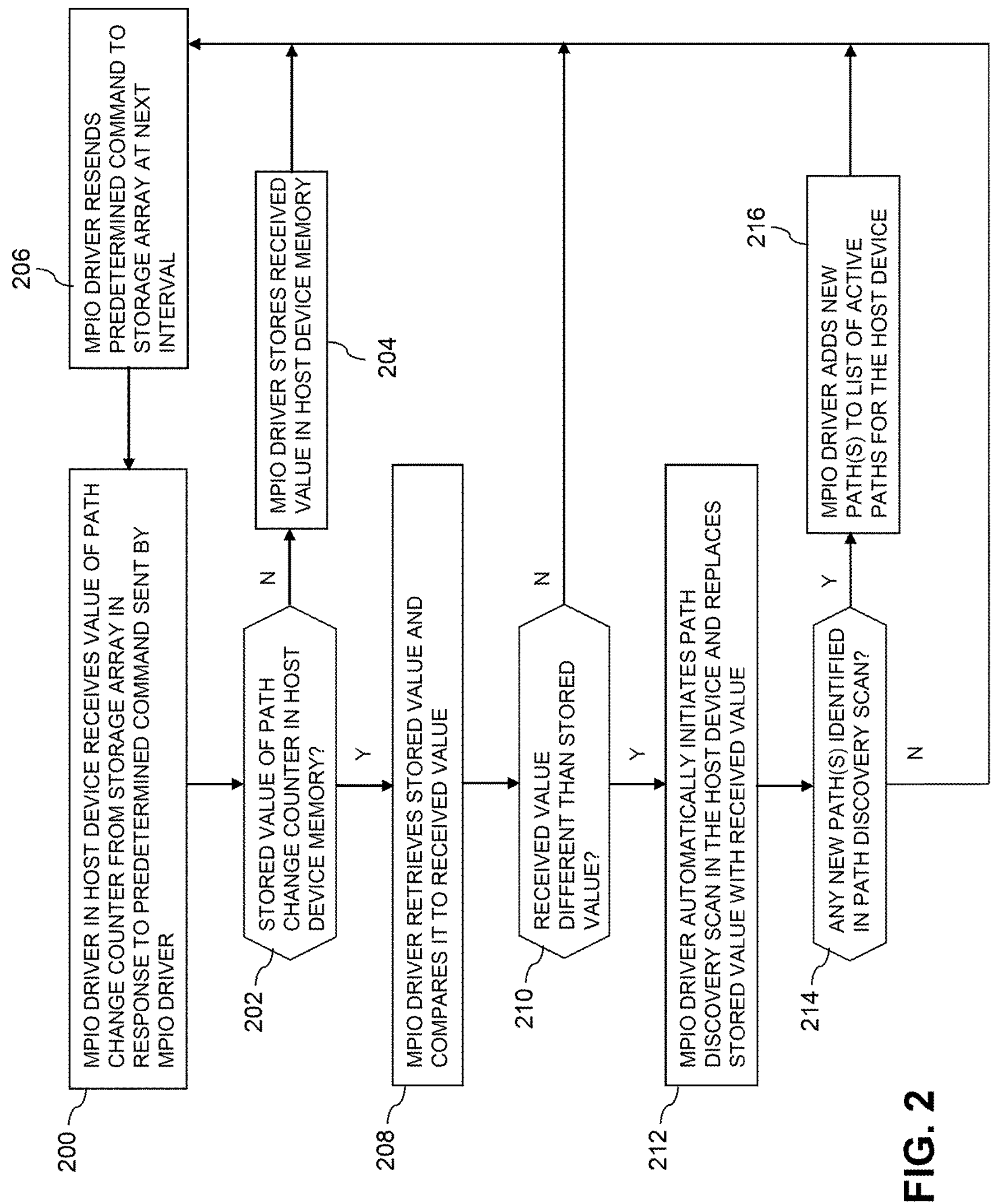
FIG. 2 is a flow diagram of a process for automated discovery of new paths utilizing a multi-path layer of a host device in an illustrative embodiment.

The steps of the FIG. 2 process are illustratively performed primarily by or under the control of an MPIO driver of a given host device, although other arrangements of system components can perform at least portions of one or more of the steps in other embodiments. This embodiment further assumes that the commands utilized by the host devices in generating 10 operations such as read and write operations directed to the storage array comprise SCSI commands, although other types of commands can be used.

In step 200, the MPIO driver in the host device receives a current value of a corresponding path change counter from the storage array in response to a predetermined command sent by the MPIO driver to the storage array. The current value of the path change counter is an example of what is also referred to herein as a "prompt" from the storage array, and more generally is a type of per-host path change information maintained by the storage array and utilized to support automated path discovery in the MPIO driver. It is assumed that the storage array in this embodiment maintains in its persistent memory a plurality of path change counters for respective ones of a plurality of host devices.

In step 202, a determination is made by the MPIO driver as to whether or not there is a stored value of the path change counter in a memory of the host device. If there is no such stored value, the process moves to step 204, and otherwise moves to step 208. The host device memory is illustratively a persistent memory of a type similar to that described elsewhere herein in the context of the persistent memory of the storage array.

In step 204, the MPIO driver stores the received value of the path change counter in the host device memory, and then moves to step 206.

In step 206, the MPIO driver resends the predetermined command to the storage array at the next interval, and then returns to step 200. For example, the predetermined command referred to in step 200 is illustratively one of a plurality of such commands sent to the storage array in respective ones of a plurality of intervals. The intervals may be periodic intervals or other types of intervals.

In step 208, the MPIO driver retrieves the stored value of the path change counter from the host device memory and compares it to the received value of the path change counter.

In step 210, a determination is made by the MPIO driver as to whether or not the received value of the path change counter is different than the stored value of the path change counter. If the received value and the stored value are the same, the process moves to step 206, and otherwise moves to step 212.

In step 212, the MPIO driver automatically initiates a path discovery scan in the host device and replaces the stored value of the path change counter in the host device memory with the received value of the path change counter.

In step 214, a determination is made by the MPIO driver as to whether or not at least one new path was identified in the path discovery scan. If at least one new path was identified, the process moves to step 216, and otherwise moves to step 206.

In step 216, the MPIO driver adds the one or more new paths to a list of active paths for the host device, and then moves to step 206. The list of active paths is an example of what is more generally referred to herein as a set of active paths, and may be maintained in the form of a table or other data structure in the host device memory.

Although path change counter values are utilized in the above-described process, other types of per-host path change information can be used in other embodiments to allow a storage array or other type of storage system to prompt one or more host devices to initiate a path discovery scan. The path discovery scan itself can be performed utilizing known functionality of conventional MPIO drivers, such as PowerPath drivers.

Multiple additional instances of the FIG. 2 process are assumed to be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and automated path discovery functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated path discovery arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional example of an illustrative embodiment implemented using the FIG. 2 process for performing automated path discovery in an MPIO layer responsive to a prompt received from a storage array will now be described. It is assumed in this embodiment that the MPIO driver of a given host device provides automated path discovery functionality in cooperation with the storage array, under the control of a corresponding automated path discovery module implemented in the MPIO driver.

In this embodiment, the storage array provides a prompt indicative of at least one path change to the host device. The prompt is illustratively conveyed over one or more existing paths from the storage array to that host device. The prompt in this embodiment may be viewed as a type of notification that conveys current per-host path change information to the host device, thereby allowing the host device to determine based on the notification that at least one path change has occurred and that the host device should automatically initiate a path discovery scan. In this embodiment, it is assumed that the host device has already been booted up and has executed an initial path discovery process to discover at least one path between the host device and the storage array. This initial path discovery process may in some cases require some manual intervention, but any subsequent path discovery scans are automatically initiated responsive to receipt of prompts from the storage array.

The automated path discovery process in this embodiment illustratively includes the following steps:

1. After booting of the host device and initial path discovery as described above, it is assumed that the host device has discovered at least one path from the host device to the storage array, and further that at least one storage device of the storage array is visible to the host device on that path.

2. The MPIO driver periodically sends a VU log sense command to the storage array to collect storage array and storage device information.

3. Responsive to the VU log sense command, the storage array exposes to the host device a current value of a path change counter maintained for the host device. This path change counter is one of a plurality of path change counters maintained by the storage array for respective ones of the host devices that share that storage array, and is an example of what is more generally referred to herein as per-host path change information.

4. The MPIO driver will store the path change counter value in the host device.

5. A storage administrator or other user performs zoning and/or masking changes to the storage array that result in at least one new path becoming available to the host. The host device initially does not detect this new path.

6. Responsive to the establishment of the new path, the storage array increments the value of the path change counter that it maintains for the host device.

7. The storage array reports the updated path change counter value in its response to the next VU log sense command received from the host device.

8. The MPIO driver compares the received value of the path change counter with its previous value as stored in the host device memory. If the counter has been incremented, in indicates that there has been a path change to the host device.

9. Responsive to the detected change in the received value of the path change counter relative to its previous value, the host device automatically initiates a path discovery scan. If the MPIO driver detects the counter increment in multiple paths, it will only react to it once. For example, a kernel-space portion of the MPIO driver may detect the counter increment, and direct a user-space portion of the MPIO driver to initiate the path discovery scan. Any storage devices on the new path or paths will also be detected as part of the scan.

10. The MPIO driver will save the new value of the path change counter in host device memory and continue to monitor for future changes in the counter value.

In the above-described process, the storage array may be made aware of the host device discovering the new path as a result of a new initiator login on a corresponding port and possibly also a host registration operation on the new path.

This embodiment allows the storage array to prompt the host device to discover new paths after zoning and/or masking have been performed, or after other changes leading to path changes to the host device.

As mentioned previously, different instances of the above-described process can be performed by different MPIO drivers in different host devices.

Again, it is to be appreciated that the particular automated path discovery arrangements described above are presented by way of illustrative example only. Numerous alternative arrangements of these and other features can be used in implementing the FIG. 2 process and other illustrative embodiments. For example, other types of per-host path change information may be utilized to allow a storage array to prompt a host device to automatically initiate a path discovery scan. Illustrative embodiments are therefore not limited to the path change counters and counter increment detection described above.

The illustrative embodiments disclosed herein can provide a number of significant advantages relative to conventional arrangements.

For example, some embodiments provide automated path discovery utilizing a multi-path layer of one or more host devices, operating in cooperation with a shared storage array or other type of storage system. The multi-path layer illustratively comprises at least one MPIO driver configured to process IO operations for delivery from a corresponding host device to the storage system. The MPIO driver includes functionality for automatically discovering new paths responsive to a prompt from a shared storage array or other type of storage system. The prompt in some embodiments is in the form of what is more generally referred to herein as per-host path change information.

These and other arrangements are advantageously configured to avoid the need for any type of manual intervention after the booting of a given host device and its discovery of an initial path to the storage system.

Such arrangements overcome the problems that can otherwise result when paths from one or more of the host devices to the storage system are added or deleted as a result of zoning and masking changes or other types of storage system reconfigurations performed by a storage administrator or other user. For example, illustrative embodiments can avoid the multiple manual interventions by a host administrator that might otherwise be required in order for the host devices to determine changes in their paths to the storage system.

Additionally or alternatively, illustrative embodiments can automatically trigger path discovery scans responsive to storage array prompts relating to path changes arising from a wide variety of other conditions, such as addition of a storage array to a storage system that includes multiple such storage arrays, possibly for purposes of seamless migration or active-active remote replication.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs. Articles of manufacture comprising such processor-readable storage media are considered embodiments of the present invention. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the automated path discovery modules 114 may be implemented at least in part in software, as indicated previously herein.

It should again be emphasized that the above-described embodiments of the invention are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path discovery modules and additional or alternative components. Also, the particular configurations of system and device elements and associated processing operations illustratively shown in the drawings can be varied in other embodiments. For example, a wide variety of different MPIO driver configurations and associated automated path discovery arrangements can be used in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:

a host device configured to communicate over a network with a storage system comprising a plurality of storage devices;

the host device comprising:

a set of input-output queues; and a multi-path input-output driver configured to select input-output operations from the set of input-output queues for delivery to the storage system over the network;

wherein the multi-path input-output driver is further configured:

to receive per-host path change information from the storage system indicating a change in at least one path from the host device to the storage system;

to automatically initiate a path discovery scan in the host device based at least in part on the received per-host path change information; and to add one or more new paths identified in the path discovery scan to a set of active paths for the host device.

2. The apparatus of claim 1 further comprising one or more additional host devices each configured to communicate over the network with the storage system and wherein each additional host device comprises a set of input-output queues and a multi-path input-output driver configured to select input-output operations from the set of input-output queues for delivery to the storage system over the network.

3. The apparatus of claim 1 wherein the multi-path input-output driver of the host device is configured to periodically send a predetermined command to the storage system and further wherein the per-host path change information is transmitted by the storage system to the multi-path input-output driver of the host device responsive to receipt of the predetermined command by the storage system.

4. The apparatus of claim 3 wherein the predetermined command comprises at least one of the following commands:

a vendor unique mode sense command;

a vendor unique log sense command; and another type of vendor unique command.

5. The apparatus of claim 1 wherein the per-host path change information received from the storage system indicates at least one of addition of one or more new paths from the host device to the storage system and deletion of one or more existing paths from the host device to the storage system.

6. The apparatus of claim 5 wherein the addition of one or more new paths or the deletion of one or more existing paths results from respective addition or deletion of at least a portion of a storage array to or from the storage system.

7. The apparatus of claim 6 wherein at least one new storage array is added to the storage system in conjunction with configuration of the storage system for at least one of a migration operation and a replication operation.

8. The apparatus of claim 1 wherein the per-host path change information received from the storage system comprises a value of a path change counter maintained by the storage system for the host device.

9. The apparatus of claim 8 wherein the multi-path input-output driver in automatically initiating a path discovery scan in the host device based at least in part on the received per-host path change information is further configured:

to store a first value of the path change counter received in a first response of the storage system to a first instance of a predetermined command sent to the storage system;

to compare the stored first value of the path change counter to a second value of the path change counter received in a second response of the storage system to a second instance of the predetermined command sent to the storage system; and to automatically initiate the path discovery scan in the host device responsive to detection of a difference between the first and second values of the path change counter.

10. The apparatus of claim 1 wherein the path discovery scan is further configured to identify one or more new logical storage volumes associated with the one or more new paths identified in the path discovery scan.

11. The apparatus of claim 1 wherein the multi-path input-output driver comprises a user-space portion and a kernel-space portion.

12. The apparatus of claim 11 wherein automatically initiating a path discovery scan in the host device based at least in part on the received per-host path change information comprises the kernel-space portion of the multi-path input-output driver detecting a difference between the received per-host path change information and previously-received per-host path change information and instructing the user-space portion of the multi-path input-output driver to run the path discovery scan responsive to the detected difference.

13. The apparatus of claim 1 wherein for each of the one or more new paths identified in the path discovery scan, the host device is configured to execute a host registration operation for that path.

14. The apparatus of claim 13 wherein the host registration operation for a given new path provides notification to the storage system that the host device has discovered the new path.

15. A method comprising:

configuring a multi-path input-output driver of a host device to communicate with a storage system over a network;

wherein the multi-path input-output driver performs the following steps:

receiving per-host path change information from the storage system indicating a change in at least one path from the host device to the storage system;

automatically initiating a path discovery scan in the host device based at least in part on the received per-host path change information; and adding one or more new paths identified in the path discovery scan to a set of active paths for the host device.

16. The method of claim 15 wherein the per-host path change information received from the storage system comprises a value of a path change counter maintained by the storage system for the host device.

17. The method of claim 16 wherein automatically initiating a path discovery scan in the host device based at least in part on the received per-host path change information comprises:

storing a first value of the path change counter received in a first response of the storage system to a first instance of a predetermined command sent to the storage system;

comparing the stored first value of the path change counter to a second value of the path change counter received in a second response of the storage system to a second instance of the predetermined command sent to the storage system; and automatically initiating the path discovery scan in the host device responsive to detection of a difference between the first and second values of the path change counter.

18. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:

to receive per-host path change information from the storage system indicating a change in at least one path from the host device to the storage system;

to automatically initiate a path discovery scan in the host device based at least in part on the received per-host path change information; and to add one or more new paths identified in the path discovery scan to a set of active paths for the host device.

19. The computer program product of claim 18 wherein the per-host path change information received from the storage system comprises a value of a path change counter maintained by the storage system for the host device.

20. The computer program product of claim 19 wherein automatically initiating a path discovery scan in the host device based at least in part on the received per-host path change information comprises:

storing a first value of the path change counter received in a first response of the storage system to a first instance of a predetermined command sent to the storage system;

comparing the stored first value of the path change counter to a second value of the path change counter received in a second response of the storage system to a second instance of the predetermined command sent to the storage system; and automatically initiating the path discovery scan in the host device responsive to detection of a difference between the first and second values of the path change counter.

* * * * *